Jan. 17, 1967   R. C. RUSSELL   3,298,470
BRAKE MECHANISM AND SYSTEM
Filed April 21, 1965   3 Sheets-Sheet 1
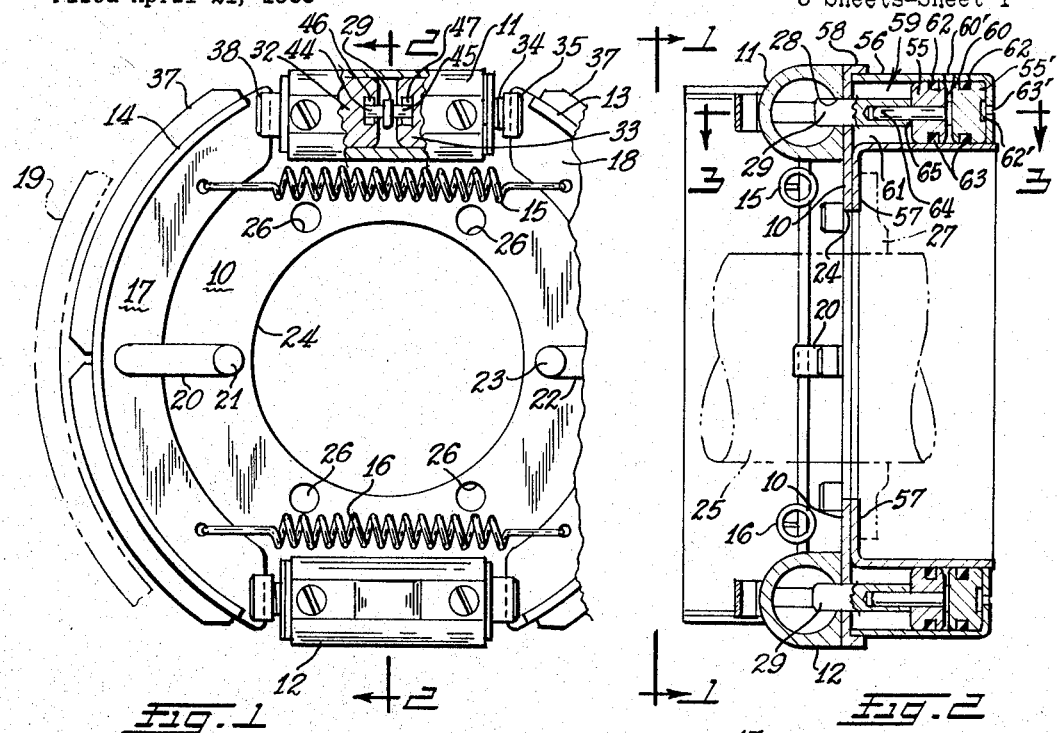
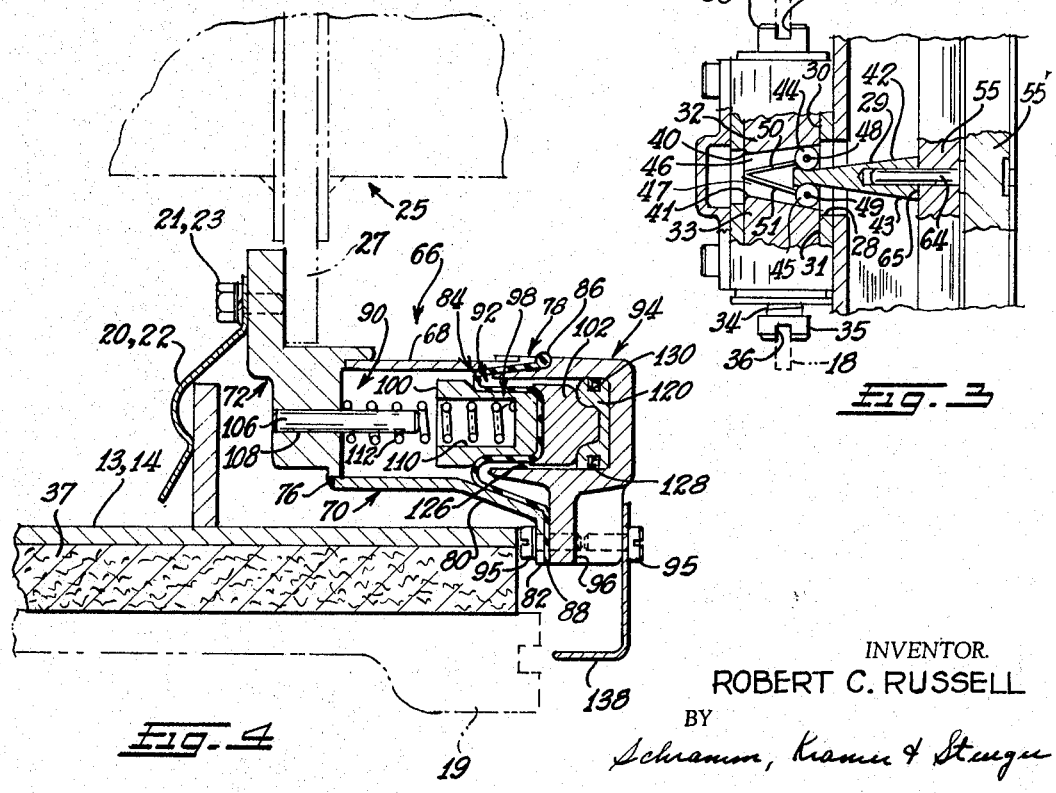
INVENTOR.
ROBERT C. RUSSELL
BY
Schramm, Kramer & Sturges
ATTORNEYS

DIAPHRAGM SHOWN IN FULL STROKE POSITION

DIAPHRAGM AND EMERGENCY PISTON IN FULL STROKE POSITION

INVENTOR.
ROBERT C. RUSSELL
BY
ATTORNEYS

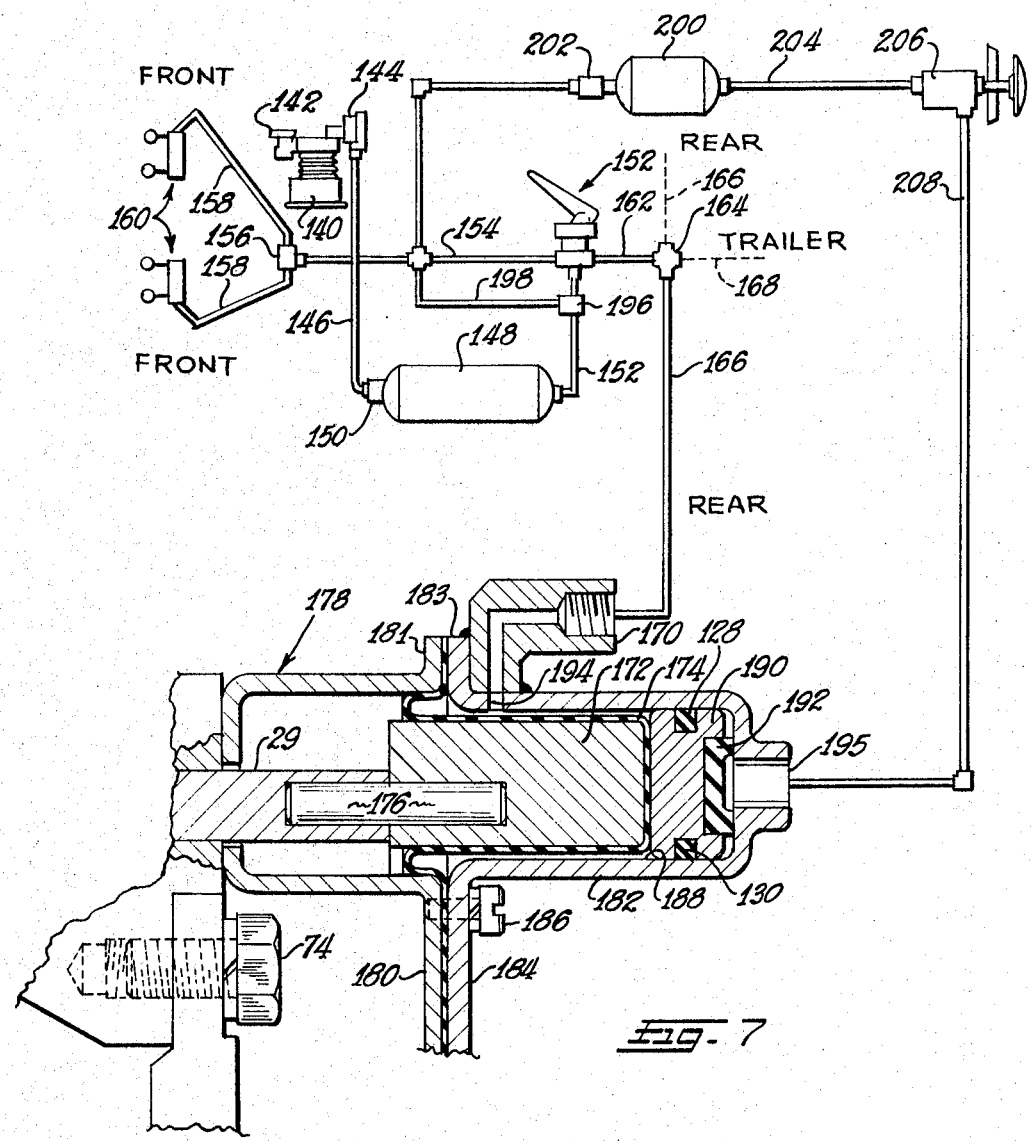

3,298,470
BRAKE MECHANISM AND SYSTEM
Robert C. Russell, Asheville, N.C., assignor to Eaton
Yale & Towne Inc., a corporation of Ohio
Filed Apr. 21, 1965, Ser. No. 449,739
2 Claims. (Cl. 188—106)

This is a continuation-in-part of copending application Serial Number 308,538, filed September 12, 1963, now Patent No. 3,187,850, and assigned to the same assignee.

This invention relates to brake mechanisms, and more particularly to improved power actuating means for a wedge-type operator for moving a brake shoe assembly into and out of frictional engagement with a brake drum. This invention has particular utility in dual wedge operated brakes although it is applicable to multi-wedge brake systems, in general.

More particularly, this invention relates to an emergency brake operator that functions in tandem with a service brake operator.

Still further, this invention relates to a brake system incorporating a service brake wedge, a service brake operator, and an overriding emergency brake operator for the service brake operator, wherein both the service and emergency operators are of the annular motor type.

Still further, this invention relates to novel features in a combination wedge operator, making possible a unique brake system.

THE PROBLEM

In the heavy duty braking art, as for application to truck semi-trailers, buses and the like, wedge-type brake operators have found broad use.

These operators are analogous to the very compact, but lighter duty hydraulic brake operators as applied to automobiles and similar lighter weight vehicles. Thus, they include opposed piston-like elements, which when forced apart, act upon the brake shoes, thereby forcing the linings into frictional engagement with the brake drums to stop the vehicle.

Of necessity, brakes for heavy, load-carrying vehicles must have tremendously increased stopping power over the lighter duty elements for automobiles. Thus, hydraulic fluid-powered units though small and compact and of a size capable of fitting within the confines of a wheel obviously cannot produce the stopping force that is necessary for designed load conditions of a heavy truck.

Further, hydraulic lines present problems of connection between a truck tractor and a semi-trailer. Therefore, compressed air systems predominate for truck and similar heavy-duty applications because lines can be connected and disconnected easily.

In order to magnify the braking force to a sufficiently high level, that is to force the brake-actuating pistons apart with enough power, a wedge is employed between the pistons instead of a small hydraulic cylinder as on an automobile brake. To cooperate with this wedge, the inner ends of the brake-actuating pistons are configured as transverse, slanted surfaces.

The wedge is coupled to a suitable fluid-powered prime mover, such as an air cylinder.

From the foregoing it will be evident that the wedge operator is a very compact and high powered unit because of the force magnification provided by the wedge. However, in pneumatically operated brakes in particular, relatively large circular diaphragm motor means have been employed for driving the wedge between the shoe plungers to force the shoes apart and into frictional engagement with the drum. To secure sufficient power transmission, the diameter of the diaphragm motor has had to be relatively large, and where more than one wedge operator has been used a separate diaphragm motor has been provided for each.

In the past, difficulty has been experienced in the construction and assembly of wedge operated brakes because the axle housing and the suspension system have enforced limitations on motor size and positioning thereby introducing troublesome design and assembly problems. For example, where individual pneumatic disc diaphragm motors are used to actuate wedge operators, the size of the diaphragm air chamber casings necessary to provide sufficient braking force has necessitated disposing the air chambers at an angle relative to the drum axis so that they will clear the axle housing and the axle flange.

Alternatively, the air chambers have been offset radially outwardly of the axle with the wedge being operated through a bell crank assembly. In certain other instances, special angular dispositions of the brake assemblies for various suspension systems or axle sizes, and/or modifications in the suspension systems themselves preclude the use of these devices altogether.

From the foregoing it is to be understood that the wedge operator is a desirable device. However, it does present problems and challenges, because of its compactness and cramped location, as to the manner in which adequate motor power can be put into it. Further, it presents problems as to the manner in which both service and emergency sub-systems can be incorporated into it.

It must be remembered that the law requires that the service and emergency systems shall each be independent of one another as regards actuation. Thus, failure of the service brake must not result in failure of the emergency system.

It has been pointed out that the prime mover for the service brakes must have sufficient power to stop the vehicle under designed load conditions. Thus, to generate enough power it must be of substantial size. This leaves a limited amount of space for incorporating an emergency brake operator, which of course must be capable of generating equivalent stopping power in the event the service brakes should fail.

THE CHALLENGE

Therefore, a brake system incorporating an emergency override for the service brake wedge operator, that could be built into a very compact space, and that would provide sufficient force to stop the vehicle under designed load conditions, and that would be of a high degree of dependability, would provide a substantial advance to the art.

OBJECTS

It is therefore an important object of the present invention to provide a novel piggy-back emergency and service brake motor operator and system, in combination with a wedge operator for heavy duty brakes.

A further object is to provide a novel, tandem-type emergency brake system that can be incorporated as an independently functioning unit, into a wedge-type service brake operator.

A still further object is to provide a brake system including both service and emergency sub-systems, and including the sub-systems in independently operable, yet tandem, overriding relation.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

The present invention may be better understood by referring to the annexed drawings which are illustrative of a preferred embodiment of the present invention, and wherein:

FIGURE 1 is a fragmentary elevational view of an improved brake assembly in accordance with this invention, taken along line 1—1 of FIGURE 2, and showing a full floating, two leading shoe type of brake assembly;

FIGURE 2 is a cross-sectional view of the brake mechanism of FIGURE 1, and taken in the plane indicated by the line 2—2 of FIGURE 1, and showing an annular, double piston motor of this invention;

FIGURE 3 is a fragmentary view, partially broken away in section, showing the wedge operator and the brake shoe actuating plungers, as taken along the line 3—3 of FIGURE 2;

FIGURE 4 is a fragmentary sectional view illustrating a second embodiment of the motor system of the present invention, using a roll-type diaphragm-driven service brake piston, a ring-sealed emergency brake piston, and illustrating one form of piston retracting means that can be employed in the present invention;

FIGURE 7 is a schematic view, partly in section, of a brake system in accordance with the present invention, and utilizing a third embodiment of the dual piston motor of the present invention.

Figure 5:
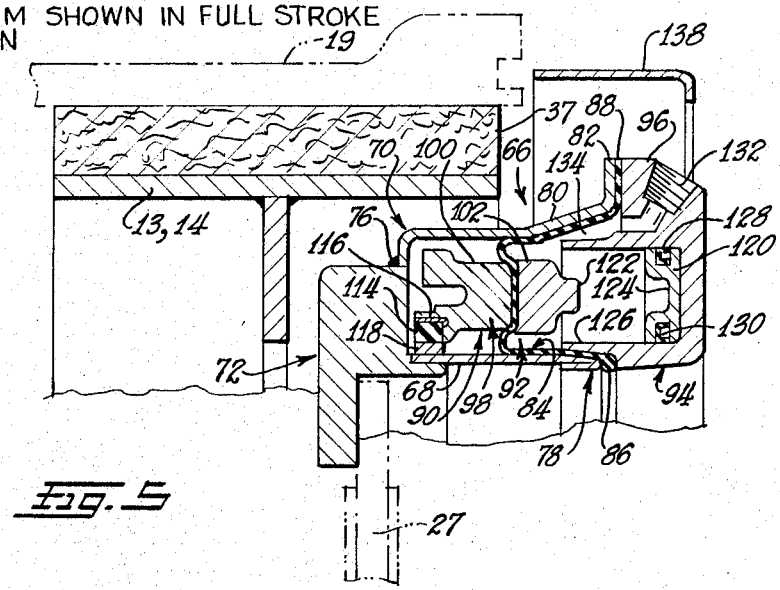
FIGURE 5 is a fragmentary sectional view showing the service brake piston in full stroke position and illustrating one form of guide means that that can be used to center the annular service brake piston during its travel.

Before explaining the present invention in detail it is to be understood that the invention is not limited in its application to the particular construction and arrangement of parts illustrated in the accompanying drawings, since the invention is capable of other embodiments and of being practiced and carried out in various ways. Also, it is to be understood that the phraseology or terminology employed herein is for the purpose of description and not of limitation.

PERSPECTIVE VIEW OF THE PRESENT INVENTION

In the novel approach provided by the present invention, the brake driving motors are annular and can thereby be readily accommodated to limitations imposed by axle housings and various other components of suspension systems. Moreover, these motors can be fully assembled with the balance of the brake mechanism before attachment to the axle flange, thus enabling "unit assembly" of the entire braking mechanism to the vehicle at once.

In the present invention novel motor means are employed to operate two or more wedge-type brake actuator assemblies, such motor means being provided in the form of two annular pistons, mounted on the same axis as the brake drum and in backed up relationship to one another. Sufficient area is provided for the pistons so that pneumatic or hydraulic actuation can be utilized.

The pistons coact with the wedge of the brake operator along a thrust axis that is perpendicular to the axis of the shoe actuating plungers. Therefore, accurate and positive braking action is provided.

Generally, the present invention resides in a wedge operated rotatable drum brake assembly having movable drum-engaging lining members, actuating members or plungers, each having one extremity coupled for movement with a corresponding adjacent drum-engaging member, and having the other extremity slanted transverse to its axis to provide an engagement surface, at least one wedge operator member reciprocably movable along a thrust axis perpendicular to the axes of the plungers and each wedge operator member having a tapered portion adapted for wedging coaction with the engagement surfaces of the brake actuating plungers.

This coaction converts movement of the wedge operator members along a thrust axis perpendicular to the axes of the actuating plungers into drum-engaging movement of the drum-engaging members, usually along a chord of the drum.

There is provided according to the present invention, in such a structure, a novel dual motor including two power actuated members encircling the drum axis and positioned adjacent to the wedge operator member, and means for operable engagement between the two encircling pistons and the operating wedge member.

THE ENVIRONMENT FOR THE INVENTION

In FIGURE 1, there is shown a double-ended or full floating, two leading shoe-type brake mechanism and the supporting means therefor, as adapted to be secured to the axle of a vehicle.

The brake mechanism is assembled around a centrally located spider 10. The brake includes two identical brake shoes 13 and 14. Brake shoes 13 and 14 are held in, and pulled back to a retracted position by two springs 15 and 16, which are similarly attached at their opposite ends to the respective shoe webs 17 and 18.

The brake shoes 13 and 14 are centered axially with respect to the brake drum 19, partially shown in FIGURE 1 in dotted lines, by any suitable means, such as by spring clips 20 and 22 secured to the spider 10 by bolts 21 and 23, respectively, on the transverse center line of the brake. Clip 20, which is of conventional design and diagrammatically shown in FIGURE 2, embraces the web 17 of brake shoe 14 and urges it against a suitable abutment shoulder, not shown, on the spider 10.

In like manner, spring clip 22 is secured as by bolt 23 to spider 10, and embraces the web 18 of brake shoe 13 and urges it against an abutment on the spider 10. In this manner, both brake shoes 17 and 18 are centrally aligned within the drum enclosure, and each of the clips 20 and 22 permits slidable rocking operational displacement of the shoes.

Spider 10 has a central opening 24 adapted to fit over the axle housing 25 (FIGURE 2), and is provided with a plurality of circumferentially spaced bolt holes 26 for securing the assembly to an axle flange, such as axle flange 27 in FIGURE 2.

As best shown in FIGURE 2, the spider 10 is provided with integral axially extending wedge housings 11 and 12, respectively. Wedge housings 11 and 12 extend at right angles to the axis of the spider 10 as shown in FIGURES 1 and 2.

As best shown in FIGURE 3, each wedge actuator housing 11 and 12 is provided with a side opening 28 of substantially rectangular configuration for slidably receiving the operator member or wedge 29. On opposite ends, the housings 11 and 12 are provided with coaxial cylindrical bores 30 and 31 that are desirably, although not necessarily, continuous and of the same diameter. Brake actuating plungers 32 and 33 are slidably disposed in bores 30 and 31, respectively.

Side opening 28 opens into both bores 30 and 31 and permits disposition of the roller and wedge assembly between the plungers 32 and 33 whereby movement of the wedge 29 along a thrust axis perpendicular to the axis of the plungers 32 and 33 causes the plungers to move laterally in opposite directions, i.e. along a chord of brake drum 19.

As shown in FIGURE 3, plunger 33 is provided with a concentric internal thread adapted to receive in concentrically disposed relation a threaded extensible adjustment member 34, the outer extremity of which is provided with a shoe-engaging cap 35. Cap 35 is provided with a slot 36 in the outer face to receive web 18 of brake shoe 13. Thus, as the brake lining 37 wears, the adjustment member 34 may be extended from plunger 33 to adjust the brake shoe 13 for proper disposition with respect to the drum 19.

No adjustment means are provided on plunger 32, the head 38 of which is slotted at 39 to receive the web 17 of brake shoe 14. Slots 36 and 39 in cap 35 and head 38 abut the shoe webs 18 and 17, respectively, so that the latter are rockably and slidably engaged thereby.

Plungers 32 and 33 are provided at their inner extremities with inclined roller engaging surfaces 40 and 41, respectively, and operating member or wedge 29 is also provided with complementarily inclined, roller-engaging surfaces 42 and 43. Disposed between confronting, inclined roller-engaging surfaces 40 and 42, for example, there is provided a roller 44 in contacting relation with both inclined surfaces, which inclined surfaces define a roller guide space. In like manner, between confronting, inclined roller-engaging surfaces 41 and 43, there is provided a roller 45 in contact with each of said surfaces, said surfaces also defining a corresponding roller guide space.

In the specific embodiment, as best shown in FIGURES 1 and 3, plungers 32 and 33 are each provided at their inner extremities with inclined planar grooves 46 and 47 of rectangular cross-sectional configuration, respectively, the rollers each being provided with axially extending projections 48 and 49, respectively. The rollers 44 and 45 are retained within the grooves 46 and 47 by means of roller-retaining lips 50 and 51 integral with plungers 32 and 33. The retaining lips 50 and 51 are formed with suitable openings so that the outer surfaces of the rollers 44 and 45 will extend therethrough for rolling engagement with the wedge 29.

The foregoing description describes briefly a typical wedge-type brake assembly of conventional design with which the motor means of the present invention are particularly well adapted for use. It will, of course, be understood that wedge-type structures other than that particularly described above may be employed with the motor devices hereof.

THE INVENTION

In order to drive the wedges 29 along thrust axes which are perpendicular to the axes of the plungers 32 and 33, and preferably parallel to the drum axis, the present invention provides a motor that includes power-actuated members which encircle the drum axis and are disposed closely adjacent to the wedge 29. Additionally, the invention provides means for operably coupling the power-actuating members to the wedge 29.

THE FIRST EMBODIMENT

In FIGURE 2, there is shown one embodiment of a fluid actuated motor utilizing the principles of the present invention. In this embodiment, there are two annular pistons 55 and 55', each of which is of the ring-seal type. An annular casing 56 slidably receives these pistons 55 and 55'.

In this embodiment of the invention, the annular cylinder casing 56 is of generally U-shaped cross sectional configuration, with the inner leg thereof being provided with a transversely extending, annular attachment flange 57. The flange 57 is adapted to be secured to the spider 10. The opposite leg of cylinder casing 56 is adapted to engage an annular flange 58 of the spider 10.

The two annular pistons 55 and 55' are disposed within the annular cylinder casing 56 for reciprocating movement within the annular cylinder chamber 59, toward and away from the spider 10.

The front piston 55 is the service brake piston and the rear piston 55' is the emergency brake piston.

The service brake piston 55 divides the annular cylinder chamber 59 into a rear, high-pressure section 60, having an inlet 60'. In front of the service brake piston 55, there is a low-pressure section 61. Thus, when fluid under pressure is applied behind the piston 55, that is, between the pistons 55 and 55' as through the inlet 60', into the high-pressure section 60, piston 55 is urged forwardly toward the spider 10. This is effective to apply the brakes of the vehicle.

Should the service brake system fail for any reason, the section 60 automatically becomes a low-pressure section. Behind the emergency piston 55' is a second high-pressure section 62'. Thus, in an emergency situation, the piston 55' takes over and in a piggy-back manner forces the service brake piston 55 forwardly to apply the brakes and stop the vehicle. Pressurized fluid is admitted through an inlet 63' to move the emergency brake piston 55'.

In order to minimize loss of fluid pressure from the high-pressure section 60 to the low-pressure section 61, suitably sealing means coacting between the service brake piston 55 and the casing 56 are provided, such as ring seals 62 and 63.

Any suitable pressure release means may be provided to bleed air out of the low-pressure chamber 61, such as a low pressure release valve, a suitable dustproof air vent, or an air vent provided as by a non-air-tight fit between the casing 56 and the flange 58.

When an emergency situation arises, the chamber 60 will automatically lose pressure. This will provide the pressure release necessary between the pistons 55 and 55'. Thus, a positive thrust transfer between pistons 55' and 55, thence to the wedge 29 will be provided. Accordingly, movement of emergency piston 55' will result in movement of piston 55, and brake actuation.

POWER TRANSMISSION

By virtue of coupling means coacting between the service brake piston 55 and the wedge 29, power is transmitted to the wedge along the thrust axis thereof, and parallel to the axis of the brake drum 19.

As shown in FIGURE 2, the service brake piston 55 is coupled to the wedge 29 directly, by means of a pin 64 which is suitably a press fit into a hole in the piston. The pin 64 extends forwardly into the base of the wedge 29. The rear face 65 of the wedge 29 is disposed in abutting relationship with the forward face of the service brake piston 55, forming an interface through which the fluid force applied to the service brake piston is transmitted to the wedge.

EXTENSION OF THE INVENTION

In the foregoing description, the pistons 55 and 55' have been described as having ring seals 62, 63 for pressure maintenance and to assure a driving force when the pressurized fluid is applied either for service or emergency operation.

In the extended scope of the invention, rolling diaphragm constructions can be used. These aspects of the invention will be brought out in the following description, along with other important construction details relating to practical applications of the invention.

Figure 6:
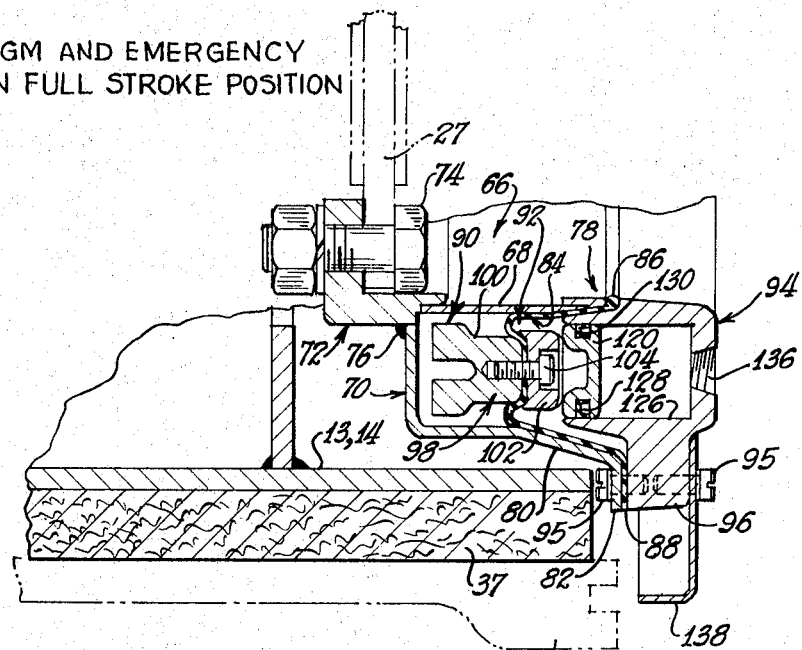
FIGURE 6 is a fragmentary sectional view similar to FIGURE 5, showing both the service and emergency pistons in full stroke position.

THE EMBODIMENTS OF FIGURES 4, 5 AND 6: ROLLING DIAPHRAGM SERVICE BRAKE PISTON, RING SEAL EMERGENCY PISTON

In this embodiment of the invention, the annular cylinder 66 is formed from inner annular wall 68 and outer annular wall 70. An annular spider 72 is secured as by bolts 74, FIGURE 6, to the flange 27 of axle housing 25. The annular walls 68 and 70 are suitably secured to the spider 72 as by intermittent welds 76.

The inner wall 68 is rolled back along its outer edge to form a diaphragm supporting shoulder 78. The outer wall 70 tapers outwardly at 80 and terminates in a radially disposed flange 82.

A rolling diaphragm 84 has the inner periphery 86 clamped over the inner wall shoulder 78 and the outer periphery 88 clamped onto the annular flange 82 of the outer wall 70.

The diaphragm 84 divides the annular cylinder 66 into a front, low pressure section 90, and behind, a high pressure section 92.

An annular cylinder head 94 is fitted over the annular cylinder 66 formed between inner wall 68 and outer wall 70. The cylinder head 94 has an outer flange 96 which is superimposed over the outer periphery 88 of the diaphragm 84 and the flange 82 of the outer wall 70.

The cylinder head 94 is held in place by bolts 95 that are passed through the flange 82 of outer wall 70 and into the outer flange 96 of the cylinder head.

The inner edge of the cylinder head 94 complements the shape of the shoulder 78 of the inner wall 68 and the inner periphery of the diaphragm 84 is clamped between these opposing elements.

The cylinder head is of substantial construction to withstand the thrust forces imposed on it by application of pressurized fluid between it and the diaphragm 84.

THE SERVICE AND EMERGENCY PISTONS

Embracing the diaphragm 84 there is provided an annular service brake piston 98. The service brake piston 98 is of two-piece construction with a portion 100 in front of the diaphragm 84, and a portion 102 behind the diaphragm.

As shown in FIGURE 6, the portions 100 and 102 of the service brake piston 98 are secured to one another by means of bolts 104 spaced around the annular composite service brake piston.

THE PISTON RETURN MECHANISM

FIGURE 4 illustrates one means that can be employed for returning the service brake piston 98 from a forward, brake-applying position, as shown in FIGURE 5, to a static position, as shown in FIGURE 4. This particular return mechanism includes a pin 106 that is pressed into a hole 108 in the spider 72. At this point, the front section 100 of the service brake piston 98 has a spring-receiving hole 110. A spring 112 is fitted over the pin 106 at one end, and at the other end is cradled in the hole 110 in the front piston section 100.

It should be noted at this point of the description that the front section 100 of service brake piston 98 does not engage either a stop, or the bottom of the annular cylinder 66. The piston 98 automatically finds bottom, in space, by the fact that brake engagement provides an automatic stop limit.

It is to be understood that the service brake piston 98 has an operable connection with the wedge 29, suitably of the type indicated in FIGURE 3.

When the brakes are applied by actuating the service brake piston 98, the wedge 29 can only travel ahead to a point of maximum brake application, where it stops. This will bottom the piston 98 at a point spaced from the bottom of the cylinder 66. The mechanism is designed so that at this point the piston 98 is off the bottom of the cylinder 66. This condition always assures positive braking, whereas a stop would overrule such by the fact that the linings could be worn to a degree that a stop would prevent adequate braking from being supplied.

CENTERING OF THE SERVICE BRAKE PISTON 98

To assure accurate travel of the piston 98 in the cylinder 66, guide means are provided as shown in FIGURE 5. This particular embodiment utilizes elastomeric pads 114 which are cemented into recesses 116 spaced around the periphery of front section 100 of piston 98. To the outer surface of each pad 114, there is bonded an antifriction pad 118, as of nylon or other self-lubricating and wear resistant material.

This arrangement is one of many that can be used within the scope of the invention. A desirable feature of course is that the construction does not require lubrication and functions well under extremes of heat and cold.

The reason for the centering of the service brake piston 98 becomes apparent by observing the cooperable nesting relationship shown between it and the emergency brake piston 120. The emergency brake piston 120 operates behind the service brake piston 98 as a ring-sealed unit, as distinguished from the diaphragm seal for the service brake piston. Because of the ring seal arrangement, the emergency brake piston 120 has substantially true lineal travel. To assure proper operable mate, the guides 114, 118 are therefore provided on the service brake piston 98, otherwise the diaphragm might permit erratic lineal motion.

To provide maximum compactness of construction between the two pistons 98 and 120, they are nested to one another as shown in FIGURES 4 and 6.

The nested relationship between the service brake piston 98 and the emergency brake piston 120 is in part provided by a ridge-like projection 122, FIGURE 5, which extends beyond the back of the rear section 102 of the service brake piston. This projection 122 fits into a mating recess 124 formed in the front side of the emergency brake piston 120, FIGURE 5.

REASON FOR DIAPHRAGM AND RING-SEAL STRUCTURES

The rolling diaphragm 84 provides a long life construction under severe service condition as encountered by brakes of the present invention. However, it takes up more room than a ring seal unit. These characteristics have been used to the maximum in the present combination. Thus, the emergency brake piston 120 will only be called upon on the rare occasion of failure of the service brakes. Since its use will thus be rare, the ring seal contributes to a very dependable, but very compact dual motor construction.

THE EMERGENCY BRAKE PISTON IN DETAIL: FIGURES 4, 5 AND 6

The emergency brake piston 120 is also of annular construction and slides within an accurately mated annular cylinder 126 formed within the cylinder head 94.

Seal means are provided in the form of inner and outer elastomeric rings 130 and 128, functioning in the nature of O-rings. Since a non-lubricated structure is involved here, the material from which the ring seals 130 and 128 are made will be selected accordingly.

The emergency piston 120 is designed to occupy a minimum amount of space in the back of the composite cylinder 66, 126 so that it and the service brake piston 98 forms a very compact dual motor construction. The construction is so compact that it will readily fit within the annular space between a wheel hub and the rim or, as indicated in the drawings, actually within the still smaller diameter of the brake shoes. Also, its axial dimension is only about ½ the width of a brake shoe, thus well within the thickness limits of a dual wheel.

For this reason, the front side of the emergency brake piston 120 is recessed at 124 to matingly receive the ridge 122 extending from the back side of the service brake piston 98, see FIGURE 5.

The emergency brake piston 120, thus exactly complements the back of the service brake piston 98 in true force-transmitting relationship. Thus, intimate contact is provided to transmit the substantial forces involved when power is applied to the emergency brake piston 120. Since the two pistons 98, 120 will thus function as a true single unit, no danger will arise of breaking or fracture due to bending stresses or the like being imposed on emergency brake piston, although it is of rather light construction and is thus of low mass for quick response.

THE SERVICE BRAKE AIR: FIGURE 5

Air to actuate the service brake piston 98 must be admitted between it and the emergency brake piston 120, thus into the high-pressure section 92 of the annular cylinder 66. For this purpose, a port 132 is provided in the flange 96 of the cylinder head 94. The port 132 connects with a passage 134 that terminates behind the diaphragm 84.

Introduction of compressed air or pressurized fluid in this manner, pushes service brake piston 98 forwardly and automatically holds the emergency brake piston 120 in its static condition at the back of the cylinder 126.

THE EMERGENCY BRAKE AIR: FIGURE 6

Emergency air must be admitted behind the emergency piston 120 in order to drive it forwardly. Accordingly, as shown in FIGURE 6, a port 136 is provided in the cylinder head 94. This port 136 terminates behind the emergency brake piston 120 and is thereby isolated from the service air or fluid which comes in on the front side of the emergency piston through the port 132, FIGURE 5.

SERVICE BRAKE PISTON FULL STROKE POSITION: FIGURE 5; EMERGENCY PISTON STATIC

When pressurized fluid is introduced through port 132, it is effective to press the diaphragm 84 forwardly, in effect spreading pistons 98 and 120 apart. The result is a movement of the service brake piston 98 forwardly to drive the wedge 29, FIGURE 3, in a brake-applying manner.

Any air in front of the diaphragm 84 is automatically vented by leakage, or by a suitable exhaust valve or other means.

Return of the service brake piston 98 is effected as indicated in FIGURE 4 by means of compression springs 112.

EMERGENCY PISTON: FULL STROKE POSITION: FIGURE 6; SERVICE BRAKE PISTON ALSO FULL STROKE

When pressurized fluid is introduced through port 136, it is effective to force the emergency brake piston 120 forwardly. This automatically carries the service brake piston 98 forwardly to apply the brakes as discussed in the previous paragraph.

Any air in front of the emergency piston 120 will be automatically vented by failure of the service brake air through port 132, FIGURE 5. Air in front of the service brake piston 98 will also be automatically vented, as described, either by leakage through a low pressure valve or other suitable means.

Return of the emergency brake piston 120 is produced by springs 112, FIGURE 4, which forces the service brake piston 98 to return to its static position. This carries with it the emergency piston 120.

EXTRANEOUS ELEMENTS TO COMPLETE THE STRUCTURE: FIGURES 4, 5 AND 6

The guide spring clips 20, 22, FIGURE 4, are of the nature of those previously described and function to orient the shoes 13, 14. The guide spring clips 20, 22 are fastened to the spider 72 by means of bolts 21, 23 passed therethrough and into the spider.

A guard 138 of annular shape protects the brake linings 37 against splashing water The guard 138 is fastened in place as indicated in FIGURES 4 and 6. Thus, bolts 95 are run through appropriate holes in the guard 138 and into the flange 96 of the cylinder head 94.

THE SYSTEM: FIGURE 7

In the present invention, the novel dual motor is tied into the compressed fluid system of the vehicle in a manner whereby both the service and emergency brake systems operate as completely independent systems.

Thus, should the service air for any reason fail, the emergency brake piston is independently free to take over because it has its own independent supply of air held under compression in a reservoir.

As shown in FIGURE 7, the pneumatic system includes a compressor 140 that is the primary source of all pressurized fluid for both systems. The compressor 140 is of the piston type, as indicated by its profile, and is adapted to be belt-powered from a suitable power take-off pulley that receives its power from the crankshaft of the engine of the vehicle.

The compressor 140 has a filtered intake 142 and an outlet 144. A line 146 connects the outlet 144 of the compressor to a reservoir and surge chamber 148. A check valve 150 holds pressure in the chamber 148 when the compressor is idle. This assures a constant supply of air for both the service and emergency systems, as long as the compressor is operational. A line 152 leads from the reservoir 148 to a treadle value 152, actuated by the foot of the operator of the vehicle.

SERVICE BRAKE POWER

From the treadle valve 152, the air flows through line 154 to a quick release valve 156. From the quick release valve 156, branch lines 158 feed to the front wheel motors designated 160, of the present invention, as previously described herein.

Also, from the treadle valve 152, compressed air flows through line 162 to a four-way connector 164. By lines 166, the air flows from the connector 164 to the rear wheels of the vehicle. By line 168, the compressed air flows to the semi-trailer, not shown.

Line 166 leads to the connector 170 for the service brake piston 172, which is backed up by a roll-type diaphragm 174. The service brake piston 172 is of the annular variety of the general nature as previously described above. The service brake piston 172 is provided with a pin 176, connecting it to the wedge member 29.

Compressed air thus flowing through the treadle valve 152 will simultaneously actuate all of the service brakes of the vehicle at all wheels, including both the tractor and the trailer.

It will be noted in this embodiment of the invention that the emergency cylinder 178 is of pressed steel construction. This is of generally U-shaped cross-sectional configuration with an attachment flange 180 extending inwardly from the inner arm thereof.

The cylinder head 182 is also of generally U-shaped configuration and has an attachment flange 184 extending from the terminus of the inner arm. Bolts 186 spaced around the periphery of the unit provide an operable connection between the cylinder 178 and the cylinder head 182. The rolling diaphragm 174 is clamped between the flanges 180, 184 and similar flanges 181, 183 on the outside of the unit.

The cylinder 182 is also, suitably of pressed steel construction with the bore 188 thereof machined or press formed to a sufficient degree of accuracy to functionally mate with the annular emergency brake piston 190.

Ring seals 128, 130 are used on the emergency brake piston 190 as previously discussed.

On the back side of the emergency brake piston 190, there is a circular bumper member 192, made of elastomeric material to provide a cushion and thus quiet the operation of the mechanism. The diaphragm 174 on the front side will thus cradle the emergency piston 190 to prevent any rattling thereof. Further, the bumper member 192 will cushion any shocks imparted to the emergency piston so as to prevent accidental fracture thereof, contributing to a durable and dependable mechanism.

A port 194 connects with the connector 170 to supply air behind the diaphragm 174. It is to be understood that the width of the cylinder bore 188 of the cylinder head 182 is of a sufficient dimension to freely receive the diaphragm and piston 172, which it surrounds. This will assure free access of air into the unit for quick response of brake application.

A port 195 is provided in the cylinder head 182 behind the emergency brake piston 190 to receive pressurized fluid when necessary for actuation of the emergency brake piston.

EMERGENCY BRAKE POWER

A T connection 196 is provided in line 152 and from the T, a line 198 leads an emergency reservoir 200. A check valve 202 provides assurance that emergency reservoir 200 is maintained full and at proper pressure at all times. A line 204 leads from the emergency reservoir 200 to an emergency hand valve 206. The hand valve 206 is suitably located on the instrument panel of the vehicle or at another convenient location for emergency operation by the operator. The operator thus had the treadle valve 152 at his foot and the emergency hand valve 206 ready for hand operation.

A line 208 leads from the emergency valve 206 to the port 195 of the cylinder head 182. Thus, air flowing through the line 208 will be effective to actuate the emergency brake piston 190 and in piggy-back fashion, which will be effective to operate the service brake piston 172 to stop the vehicle, in the event of any type of failure of the service brake system.

OPERATION

From the foregoing, it will be evident that service brake air and emergency air come from functionally independent sources, namely the service air reservoir 148 and the emergency reservoir 200. The check valve 202 of the emergency air reservoir 200 provides an assurance that an independent, reserve supply is always present.

GENERAL DISCUSSION OF THE CONTRIBUTION TO THE ART BY THE PRESENT INVENTION

By the present invention, there has been provided an improved, novel dual-type motor of very compact radial and axial dimensions to fit within the confines of a wheel and accommodate the axle housing, steering or suspension components. The mechanism is sufficiently compact in radial dimension to be embraced within the limits of the brake shoes. Axially, it is a compact, pancake-type structure that fits within about half the length of a dual wheel hub.

There has thus been provided an improved motor for driving a force transmitting means such as a brake actuating wedge, into engagement with a force receiving means movable relative thereto. The motor means is in the form of two annular pistons reciprocably mounted for piggy-back type operation within an annular cylinder chamber including means for subdividing the annular cylinder chamber into a high-pressure section and a low-pressure section.

The motors of the present invention may be fluid operated either with hydraulic fluid or compressed gas, e.g., air.

Because of the relatively large area provided by the annular piston construction of the present invention, disposed between a high pressure section and a low pressure section of an annular cylinder, the requisite brake-engaging force is easily generated.

In the case of braking mechanisms encompassed within the scope of the present invention, this force is uniformly transmitted to two or more wedges.

These wedges function to drive brake shoe-engaging plungers along chords of the brake drums and in turn bring brake drum engaging linings into frictional engagement with the drums to stop a vehicle under its maximum design load conditions.

Unitary construction is provided by the present invention. Thus, instead of a plurality of individual motors for operating each of a plurality of operating members or wedges, a single, dual action motor is provided for operating a plurality of wedges, meaning at least two. This assures application of identical pressure to each web, making the brake lining wear more uniform.

Moreover, the annular piston-cylinder constructions of the present invention are readily accommodated by present wheel-axle assemblies, characterized by an axle flange to which the brake assembly is secured. The constructions of the present invention also provide an advance to the art by the fact that the parts are relatively simple to manufacture, are easily assembled and are readily accessible for adjustment and maintenance if and when such should become necessary.

What is claimed is:

1. A dual motor system for a wedge-operated brake assembly including an axle carrying a flange, a wheel mounted for rotation on the axle and having a brake drum secured thereto for rotation therewith, radially expanding friction type brake shoes mounted on the flange, and an operator member reciprocably movable and having a tapered portion operably disposed for wedging coaction between the extremities of the brake shoes, said dual motor system comprising,
a housing fixed relative to the wheel axis,
said housing defining an annular cylinder surrounding the axle,
a head closing one end of said annular cylinder,
a first annular piston reciprocable within said annular cylinder,
means operably coupling the operator member to said first annular piston,
first divider means dividing said annular cylinder into a first sub-chamber on one side of said first annular piston and a second sub-chamber on the other side of said first annular piston,
said first divider means comprising a rolling diaphragm coupled to said first piston and the cylinder wall,
a second piston reciprocable within said cylinder between said first piston and said head,
second divider means dividing said cylinder into a third sub-chamber between said second piston and said head,
service means for introducing pressurized fluid into the sub-chamber between said pistons during normal actuation of the brakes by a foot control to force said first piston away from said head and said second piston toward said head, said service means including,
a first fluid reservoir in communication with said sub-chamber between said pistons by means of a port in the cylinder wall between said rolling diaphragm and said head,
service valve means for controlling flow from said first reservoir to said sub-chamber,
said service valve means actuated by said foot control,
emergency means for alternately introducing pressurized fluid into said third sub-chamber to force both of said pistons away from said head to thereby move the operator member, said emergency means including,
a second fluid reservoir in communication with said third sub-chamber,
emergency valve means for controlling flow from said second reservoir to said third sub-chamber,
the distance between said port in said cylinder wall and said head being at least equal to the stroke of said second piston whereby free communication between said first and second reservoirs is prohibited during actuation of said emergency means.

2. The invention of claim 1 in which said second divider means is further defined by ring seals carried by said second piston and coacting in sealing engagement with said cylinder wall.

References Cited by the Examiner

UNITED STATES PATENTS 2,064,575  12/1936  Taylor _____ 188—152
2,079,858   5/1937  Horton _____ 92—100 X (Other references on following page)

UNITED STATES PATENTS

| | | | |
|---|---|---|---|
| 2,351,040 | 6/1944 | Hawley | 188—152 |
| 2,577,462 | 12/1951 | Hackney | 92—63 X |
| 2,757,640 | 8/1956 | White | 188—152 X |
| 2,816,626 | 12/1957 | Fawick | 303—2 |
| 2,820,434 | 1/1958 | Otto | 92—101 X |
| 2,930,362 | 3/1960 | Riester et al. | 92—93 X |
| 2,936,785 | 5/1960 | Hastings | 92—63 X |
| 3,022,770 | 2/1962 | Sanders et al. | 92—107 |
| 3,155,197 | 11/1964 | Lee et al. | 188—152 |
| 3,173,342 | 3/1965 | Wilson | 92—100 X |
| 3,187,850 | 6/1965 | Russell | 188—152 |

FOREIGN PATENTS

| | | |
|---|---|---|
| 660,663 | 3/1963 | Canada. |
| 1,300,709 | 7/1962 | France. |

MILTON BUCHLER, *Primary Examiner.*

FERGUS S. MIDDLETON, *Examiner.*

G. E. A. HALVOSA, *Assistant Examiner.*